United States Patent
Thiel et al.

(10) Patent No.: US 10,369,623 B2
(45) Date of Patent: Aug. 6, 2019

(54) BIO-BASED BINDER SYSTEM

(71) Applicant: UNIVERSITY OF NORTHERN IOWA RESEARCH FOUNDATION, Cedar Falls, IA (US)

(72) Inventors: Gerard R. Thiel, Dysart, IA (US); Shoshanna R. Coon, Shell Rock, IA (US); Mitchell Patterson, Cedar Falls, IA (US); Andrew Simonson, De Witt, IA (US); Ian Williams, Cedar Rapids, IA (US); Ryan Jones, Grundy Center, IA (US)

(73) Assignee: University of Northern Iowa Research Foundation, Cedar Falls, IA (US)

( * ) Notice: Subject to any disclaimer, the term of this patent is extended or adjusted under 35 U.S.C. 154(b) by 389 days.

(21) Appl. No.: 15/199,312

(22) Filed: Jun. 30, 2016

(65) Prior Publication Data

US 2016/0311013 A1    Oct. 27, 2016

Related U.S. Application Data

(62) Division of application No. 12/742,551, filed as application No. PCT/US2008/083597 on Nov. 14, 2008, now abandoned.

(60) Provisional application No. 60/987,947, filed on Nov. 14, 2007.

(51) Int. Cl.
| | | |
|---|---|---|
| B22C 1/26 | (2006.01) | |
| B22C 1/22 | (2006.01) | |
| C08G 18/64 | (2006.01) | |
| C09J 175/04 | (2006.01) | |

(52) U.S. Cl.
CPC .............. *B22C 1/26* (2013.01); *B22C 1/2273* (2013.01); *C08G 18/6484* (2013.01); *C09J 175/04* (2013.01)

(58) Field of Classification Search
None
See application file for complete search history.

(56) References Cited

U.S. PATENT DOCUMENTS

| | | | |
|---|---|---|---|
| 3,409,579 A | 11/1968 | Janis | |
| 3,429,848 A | 2/1969 | Robins | |
| 3,432,457 A | 3/1969 | Robins | |
| 3,645,942 A | 2/1972 | Brown et al. | |
| 3,676,392 A | 7/1972 | Robins | |
| 3,743,621 A | 7/1973 | Molotsky | |
| 3,755,229 A * | 8/1973 | Johnson ................... | C08K 3/16 523/144 |
| 3,925,296 A * | 12/1975 | Stone ................. | C08G 18/3215 523/143 |
| 4,293,480 A * | 10/1981 | Martin ................. | B22C 1/2273 523/143 |
| 4,361,181 A | 11/1982 | Wischnack et al. | |
| 4,396,430 A | 8/1983 | Matalon | |
| 4,469,517 A * | 9/1984 | Cooke, Jr. ................. | B22C 1/00 106/38.3 |
| 4,585,858 A | 4/1986 | Molotsky et al. | |
| 4,705,570 A | 11/1987 | Paul et al. | |
| 5,286,765 A | 2/1994 | Franke et al. | |
| 5,539,019 A | 7/1996 | Suskind et al. | |
| 6,040,355 A | 3/2000 | Kurple | |
| 2005/0017394 A1 | 1/2005 | Hochsmann et al. | |

FOREIGN PATENT DOCUMENTS

| | | |
|---|---|---|
| EP | 769338 A1 | 4/1997 |
| EP | 746432 B1 | 12/2001 |
| JP | 5728649 A | 2/1982 |
| JP | 2006512465 A | 4/2006 |
| WO | 8000135 A1 | 2/1980 |
| WO | 2009004086 A1 | 1/2009 |

OTHER PUBLICATIONS

European Patent Application No. 08850786.8, European Search Report and Opinion dated Aug. 19, 2011, 10 pages.
International Patent Application No. PCT/US2008/083597, International Search Report and Written Opinion dated Jan. 21, 2009, 6 pages.
U.S. Appl. No. 12/742,560, Non-Final Office Action dated May 9, 2013, 10 pages.

* cited by examiner

*Primary Examiner* — Melvin C. Mayes
*Assistant Examiner* — Stefanie J Cohen
(74) *Attorney, Agent, or Firm* — Fredrikson & Byron, P.A.

(57) ABSTRACT

A bio-based binder system for use in preparing foundry molds. In a preferred embodiment, the system includes the use of a) a polymerizable hydroxyl-containing component comprising a saccharide, b) an isocyanate component, and c) a catalyst, and preferably amine catalyst, component adapted to catalyze the polymerization of a) and b), in the presence of a foundry aggregate such as sand. The system can be used in any suitable manner, including in either a cold box process or no bake process as described herein.

18 Claims, No Drawings

US 10,369,623 B2

BIO-BASED BINDER SYSTEM

CROSS REFERENCE TO RELATED APPLICATION

This application is a divisional of U.S. patent application Ser. No. 12/742,551, filed May 12, 2010, now abandoned, which is a 371 National Stage filing of International Application No, PCT/US2008/083597 filed Nov. 14, 2008, which in turn claims priority to U.S. Provisional Application No. 60/987,947 filed Nov. 14, 2007. The entire contents of these references are incorporated herein by reference.

TECHNICAL FIELD

This invention relates to urethane forming foundry binders, and mixes prepared with these binders.

BACKGROUND OF THE INVENTION

Conventional foundry binders include both a phenol formaldehyde component and an organic polyisocyanate component. Foundry mixes are prepared by mixing the binder with a foundry aggregate. Foundry shapes (molds and cores) are typically prepared by shaping the mix and curing the foundry shape with a liquid or gaseous tertiary amine curing catalyst.

One of the major processes used in the foundry industry for making metal parts is sand casting. In sand casting, disposable foundry shapes (usually characterized as molds and cores) are made by shaping and curing a foundry mix which is a mixture of sand and an organic or inorganic binder. The binder is used to strengthen the molds and cores.

One of the processes used in sand casting for making molds and cores is the "cold-box" process. In this process a gaseous curing agent is passed through a compacted shaped mix to produce a cured mold and/or core. An alternative process is the "no bake" method, that involves the use of liquid catalysts such as tertiary liquid amines.

A phenolic-urethane binder system commonly used in the cold-box process is cured with a gaseous tertiary amine catalyst. See for example, U.S. Pat. Nos. 3,409,579, 3,429,848, 3,432,457, and 3,676,392. The phenolic-urethane binder system usually consists of a phenolic resin component and poly-isocyanate component which are mixed with sand prior to compacting and curing to form a foundry mix. Such phenolic-urethane binders used in the cold-box process, have proven satisfactory for casting such metals as iron or steel which are normally cast at temperatures exceeding about 1400 C. They are also useful in the casting of light-weight metals, such as aluminum, which have melting points of less than 800 C.

There are disadvantages to using phenolic-urethane binders in the cold-box process. Both the phenolic resin component and polyisocyanate component generally contain a substantial amount of organic solvent which can be obnoxious to smell. Additionally, these binders contain small amounts of free formaldehyde and free phenol which may be undesirable. Because of this, there is an interest in developing binders which do not use organic solvents and do not contain free formaldehyde or free phenol. Additionally, when the two components of the phenolic-urethane binder system are mixed with the sand to form a foundry mix, they may prematurely react prior to curing with the gaseous catalyst. If this reaction occurs, it will reduce the flowability of the foundry mix when it is used for making molds and cores, and the resulting molds and cores will have reduced strengths.

SUMMARY OF THE INVENTION

The present invention provides a novel bio-based binder system for use in preparing foundry molds. In a preferred embodiment, the system includes the use of a) a polymerizable hydroxyl-containing component ("PHCC") comprising a saccharide, b) an isocyanate component, and c) a catalyst, and preferably tertiary amine catalyst, component adapted to catalyze the polymerization of a) and b), whereby a) and b), and c) as well, if included and used as a liquid, can be provided in a solvent-diluted system that can be mixed with and cured in the presence of a foundry aggregate such as sand. The system of this invention can be used in any suitable manner, including in either a cold box process or no bake process as described herein.

The binder system of this invention can be used to replace, in whole or in part, conventional phenolic based binder systems. In turn, a preferred binder system of this invention is substantially free of formaldehyde or phenols, and preferably contains little or no aromatic solvents. When reactive solvents or no solvents are used, there are no volatile organic compounds (VOC's) present in the binder system. Thus, the compositions of this invention are environmentally attractive.

In another aspect, the invention provides saccharide-containing PHCC compositions that are adapted (e.g., in either chemical and/or physical ways) for use in preparing a binder system of this invention, as well as kits and combinations that include two or more of components a), b) and/or c), and that are selected and used for preparing a binder system of this invention. In turn, such a kit or combination preferably provides the components in actual and relative amounts and/or concentrations adapted for their use.

DETAILED DESCRIPTION

In one embodiment, the binder system of this invention comprises a polymerizable hydroxyl-containing component (PHCC) comprising a saccharide. Suitable saccharides are selected from mono, di-, oligo-, and polysaccharides, alone or in solution with other compounds, including derivatives and combinations thereof.

A PHCC, as used in this invention, can include monofunctional alcohols and polyols. Monofunctional alcohols include, but are not limited to, aliphatic alcohols such as methanol and ethanol. Polyols can include, but are not limited to, saccharides. The term "polyol" in the present invention is defined as a compound having at least two hydroxyl groups capable of reacting with an isocyanate. As exemplified below, one preferred non-saccharide polyol is ethylene glycol, a relatively simple molecule having two hydroxyl groups. Without limiting the scope of the invention, representative examples of other non-saccharide polyols include 1,2-propylene glycol; 1,3-propylene glycol; hexane 1,6-diol; 2methyl-1,3-propanediol; glycerol; mannitol; sorbitol; diethylene glycol; triethylene glycol; polyethylene glycols; polypropylene glycols; and butylene, dibutylene, and polybutylene glycols.

The non-saccharide PHCC's, if present, are preferably present in the binder system in an amount ranging from about 1 to about 60 weight percent of the system (i.e., combination of whatever PHCC, isocyanate, liquid catalyst and solvent(s) may be present), more preferably from about 10 to about 50 weight percent of the system, and most preferably from about 15 to about 25 weight percent of the system. Amounts of non-saccharide PHCC higher than about 60 percent tend to require too much isocyanate component to be economically viable, while amounts lower than about 1 percent tend to not dissolve the saccharide to react effectively with the isocyanate.

Saccharides are members of the carbohydrates family, a class of molecules comprising polyhydroxy-aldehydes and polyhydroxyketones. Saccharides range from relatively small, simple monosaccharides such as glucose or fructose, to somewhat larger oligosaccharides, such as hetero- or homopolymers of saccharide units, to considerably larger, more complex polysaccharides such as cellulose, levan, and pullulan. A common aspect of all saccharides is the presence of multiple hydroxyl groups and at least one aldehyde or ketone functionality.

A preferred saccharide of this invention is corn syrup, a mixture of various chain length saccharides produced by hydrolyzing the polysaccharides in corn starch. Corn syrup contains aldohexoses, ketohexoses, and a number of other saccharides that contain varying numbers of hydroxyl, aldehyde and ketone groups. Yet another preferred saccharide source is molasses, e.g., either from the sugar beet or cane molasses. Molasses is generally referred to as the syrup that comes from the final crystallization stage, with intermediate syrups being referred to as high green or low green. Beet molasses is about 50% sugar by dry weight, predominantly sucrose, but containing significant amounts of glucose and fructose. The non-sugar content can include many ions such as calcium, potassium, oxalate, and chloride.

The saccharide (e.g, in the form of corn syrup) may be used in substantially unmodified form, or it may be physically altered by removal of a substantial amount of the water in the syrup, or it may be chemically altered by derivitization or caramelization. Caramelization is the process of applying heat to a solution containing saccharide, in order to remove water and melt the saccharide. The caramclization process itself involves a complex series of chemical reactions that can include, for instance, condensation, decomposition, isomerization, fragmentation, and polymerization reactions.

Other suitable saccharides include individual mono, di-, oligo-, and polysaccharides as well as mixtures produced either synthetically or from natural products such as vegetable starches or bacterial or yeast fermentation. Furthermore, although the present experiments utilized saccharides and saccharide mixtures obtained from retail grocery stores or from corporate suppliers, (Archer Daniels Midland for high fructose corn syrup, Montana Polysaccharides for levan, and Hyashibara International for pullulan), there is no reason to believe that the source of the saccharides or mixtures is critical to the results obtained below. Consequently, one of ordinary skill in the art will understand that the present invention encompasses the use of mono, di-, oligo-, and polysaccharides and mixtures and derivatives of them, irrespective of source.

The one or more saccharides are preferably present in the binder system in a total amount ranging from about 5 to about 65 weight percent of the binder, more preferably from about 10 to about 40 weight percent of the binder, and most preferably from about 15 to about 20 weight percent of the binder. Amounts of saccharide lower than about 5 percent tend not to demonstrate appreciable improvement in mechanical performance as compared to a comparable composition lacking the saccharide, while amounts of saccharide higher than about 65 weight percent of the binder tend to consume too much isocyanate to be economically viable.

The binder system of this invention further comprises an isocyanate component. Isocyanates useful in the current invention include those that perform as suitable building blocks in polyurethane chemistry such as aromatic, aliphatic, or cycloaliphatic polyisocyanates having at least two active isocyanate groups per molecule. Preferred isocyanates include "Mondur 541", a commercially available diphenylmethane diisocyanate, a polyisocyanate, and Rubinate (1780), a water-compatible polyisocyanate based on diphenylmethane diisocyanate, commercially available from Huntsman-TCI.

Without limiting the scope of the invention, representative examples include 2,4- and 2,6-diisocyanatotoluene (TDI) and their derivatives; methylenediphenyl 4,4'-, 2,4- and 2,2'-diisocyanates (MDI) and their derivatives; industrial products which may additionally comprise products having more than one ring (polymeric MDI's or PMDI); 1,5-naphthalene diisocyanate (NDI); 4,4',4"-triisocyanatotriphenylmethane and bis(3,5-diisocyanato-2-methylphenyl)methane; 1,6-hexamethylene diisocyanate (HDI); and 3-isocyanatomethyl-3,5,5-trimethylcyclohexyl(isophorone) isocyanate (IPDI). Many such isocyanates are available commercially. Furthermore, basic polyisocyanates may also be modified by bi- or trimerization to produce carbodiimides, uretdiones, biurets, and allophanates.

The one or more isocyanates are preferably present in the binder composition in an amount ranging from about 10 to about 80 weight percent of the binder, more preferably from about 20 to about 70 weight percent of the binder, and most preferably from about 25, and more preferably from about 30 to about 60 weight percent of the binder.

The PHCC portion of the binder system may include solvents in addition to the saccharide. These solvents may be reacting with the isocyanate component, such as alcohols and non-saccharide polyols, or nonreactive with isocyanate, such as an alkylene carbonate, e.g., propylene carbonate, butylene carbonate, and the like. The solvent(s) can be used, at least in part, to adjust the viscosity of the binder system for its intended purpose, e.g., when used with an aggregate, to adjust the viscosity to between about 50 centipoise (cps) and about 400 cps, and more preferably between about 100 cps and about 300 cps.

Various types of aggregate and amounts of binder are used to prepare foundry mixes by methods well known in the art. Ordinary shapes, shapes for precision casting, and refractory shapes can be prepared by using the binder systems and proper aggregate. The amount of binder and the type of aggregate used is known to those skilled in the art.

The preferred aggregate employed for preparing foundry mixes is sand wherein at least about 70 weight percent, and preferably at least about 85 weight percent, of the sand is silica. Other suitable aggregate materials for ordinary foundry shapes include zircon, olivine, aluminosilicate, chromite sand, and the like.

In ordinary sand type foundry applications, the amount of binder system (including any PHCC, isocyanate, and if present catalyst and solvent) is generally no greater than about 10% by weight and frequently within the range of about 0.2% to about 5% by weight based upon the weight of the aggregate. Most often, the binder content for ordinary sand foundry shapes ranges from about 0.5% to about 2% by weight based upon the weight of the aggregate in ordinary sand-type foundry shapes. The binder system of this invention is preferably made available as a three part system with the saccharide component in one package, the organic polyisocyanate component in the second package, and the catalyst in the third package. When making foundry mixes, usually the binder components are combined and then mixed with sand or a similar aggregate to form the foundry mix or the mix can be formed by sequentially mixing the components with the aggregate. Preferably the saccharide-containing PHCC and isocyanate are first mixed with the sand before adding the catalyst component. Methods of distributing the binder on the aggregate particles are well-known to those skilled in the art. The mix can, optionally, contain other ingredients such as iron oxide, ground flax fibers, wood cereals, pitch, refractory flours, and the like.

The catalyst component of this invention preferably comprises a tertiary amine catalyst, which can be provided in either liquid (e.g., as in a "no bake" process) or gaseous form (as in a cold box process), or both.

In a preferred embodiment, the process for preparing a foundry shape by the coldbox process comprises:

(1) providing the ingredients needed to form a binder system as described herein, (2) mixing the ingredients with a foundry aggregate under conditions suitable to then shape the foundry mix into a desired core and/or mold;

(3) contacting the shaped foundry mix with a catalyst (e.g., gaseous tertiary amine catalyst); and (4) removing the foundry shape of step (3) from the pattern.

In a preferred "cold box" embodiment of this invention the foundry mix (binder system and aggregate) can be molded into the desired shape, whereupon it can be cured. Curing can be effected by passing a tertiary amine gas through the molded mix such as described in U.S. Pat. No. 3,409,579, hereby incorporated into this disclosure by reference. Gassing times are dependent on core weight and geometry and typically range from 0.5 to 30 seconds. Purge times are dependent or core weight and geometry and typically range from 1 to 60 seconds.

Metal castings are made by pouring molten metal into and around an assembly of molds and/or cores made with the subject binders and sand. In turn, using the cold box process, a preferred process of casting a metal comprises:

(1) preparing a foundry core and/or mold as described herein;

(2) providing and pouring metal while in the liquid state into and around said shape;

(3) allowing the metal to cool and solidify; and (4) then separating the molded article from the core or mold.

Given the present description, those skilled in the art will also appreciate the manner in which a binder system of this invention can also be used to form molds using a no bake process. In one such preferred embodiment, a binder system as described herein, including a liquid catalyst, is provided and used to contact a corresponding aggregate component to form a shaped core and/or mold. The catalyst can be included in any suitable manner and any suitable time, e.g., together with the PHCC component, at the time of mixing any of the components of the binder system together, or even after the combination of binder system with the aggregate.

In turn, a preferred no bake method using the system of the present invention can include:

(1) providing the ingredients needed to form a binder system as described herein, providing and mixing at least the PHCC, isocyanate and any solvents that may be used together in a composition;

(2) including liquid catalyst in any suitable manner and time, e.g., within one or more of the individual ingredients, or adding it to the combination of ingredients prior to, during, and/or after contact with the foundry aggregate;

(3) mixing the ingredients with a foundry aggregate under conditions suitable to then shape and cure the foundry mix into a desired core and/or mold;

(4) removing the foundry shape of step (3) from the pattern.

A suitable liquid amine catalyst for use in such a process is a base having a pKb value generally in the range of about 7 to about 11. The term "liquid amine" is meant to include amines which are liquid at ambient temperature or those in solid or gaseous form which are dissolved in appropriate solvents. The pKb value is the negative logarithm of the dissociation constant of the base and is a well-known measure of the basicity of a basic material. The higher this number is, the weaker the base. The bases falling within this range are generally organic compounds containing one or more nitrogen atoms. Specific examples of bases which have pKb values within the necessary range include 4-alkyl pyridines wherein the alkyl group has from one to four carbon atoms, isoquinoline, arylpyridines such as phenyl pyridine, pyridine, acridine, 2-methoxypyridine, pyridazine, 3-chloro pyridine, quinoline, N-methyl imidazole, N-ethyl imidazole, 4,4'-dipyridine, 4-phenylpropylpyridine, 1-methylbenzimidazole, and 1,4-thiazine. Preferably used as the liquid tertiary amine catalyst is an aliphatic tertiary amine, particularly [tris (3-dimethylamino) propylamine].

In view of the varying catalytic activity and varying catalytic effect desired, catalyst concentrations will vary widely. In general, the lower the pKb value is, the shorter will be the work time of the composition and the faster, more complete will be the cure. In general, catalyst concentrations will be a catalytically effective amount which generally will range from about 0.1% to about 90% by weight of the PHCC component, preferably 0.2% by weight to 80% by weight based upon the PHCC component.

In a one embodiment of the invention, the liquid catalyst level is adjusted to provide a work time for the foundry mix of 1 minute to 30 minutes, preferably 4 minutes to about 10 minutes, and a strip time of about 1 minute to 30 minutes, preferably 5 minutes to about 12 minutes.

Work time is defined as the time interval after mixing the polyisocyanate, disaccharide, and catalyst and the time when the foundry shape reaches a level of 45 on the Green Hardness "B" Scale Gauge sold by Harry W. Dietert Co., Detroit, Mich. Striptime is time interval after mixing the polyisocyanate, polyol, and catalyst and the time when the foundry shape reaches a level of 90 on the Green Hardness "B" Scale Gauge. The aggregate employed with the catalyzed binder in producing the foundry mix should be sufficiently dry so that a handleable foundry shape results after a work time of 3 to 10 minutes and a strip time of 4 to 12 minutes. The bench life of the foundry mix is the time interval between forming the foundry mix and the time when the foundry mix is no longer useful for making acceptable molds and cores.

A measure of the usefulness of the foundry mix and the acceptability of the molds and cores prepared with the foundry mix is the tensile strength of the molds and cores. If a foundry mix is used after the bench life has expired, the resulting molds and cores will have unacceptable tensile strengths. Because it is not always possible to use the foundry mix immediately after mixing, it is desirable to prepare foundry mixes with an extended bench life. Many patents have described compounds which improve the bench life of a phenolic-urethane foundry mix. Among the compounds useful to extend the bench life of the foundry mix are organic and/or inorganic phosphorus containing compounds.

Foundry shapes, including both foundry cores and molds, are made by mixing the binder compositions of the present invention with aggregates using mixing methods well known in the art. One common method is to meter the PHCC component, isocyanate component, and any catalyst into a foundry aggregate such as silica sand as it goes through a high speed continuous mixer to form a foundry mix. The foundry mix, i.e., the intimately mixed sand binder composition, is placed in a pattern and allowed to cure at ambient temperature. After curing, the self-supporting foundry shape can be removed from the pattern. The foundry shapes, typically including mold halves and any needed cores, are assembled to give a complete mold into which molten metal can be poured. On cooling, a metal casting having the shape of the sand mold is produced. Suitable aggregate materials for foundry shapes include silica sand, lake sand, zircon, olivine, chromite, mullite and the like.

Additives commonly used in the foundry art to improve casting quality such as black iron oxide, red iron oxide, clay, wood flour and the like may be incorporated into the foundry mix compositions. Other optional ingredients that may be added to the polyol component are adhesion promoters and release agents. Silane coupling agents such as gamma-ureidopropyltriethoxysilane, and gamma-aminopropyltrimethoxysilane may be added to increase tensile strengths and improve humidity resistance. Release agents such as glycerol trioleate and oleic acid may be added in small amounts to improve release from mold patterns. Although not preferred, core and mold coatings may be applied to the bonded sand cores and molds of this invention to reduce erosion and improve casting finish in difficult casting applications.

EXAMPLES

The following examples will serve to illustrate the preparation of several foundry binder compositions within the scope of the present invention. It is understood that these examples are set forth for illustrative purposes and that many other compositions are within the scope of the present invention. Those skilled in the art will recognize that similar foundry binder compositions may be prepared containing different quantities of materials and equivalent species of materials than those illustrated below. All parts are by weight unless otherwise specified.

In the following experiments, commercial, food grade corn syrup was tested with different concentrations of isocyanate resins and additives. Although the data are not exhaustive, they will illustrate to one skilled in the art that the corn syrup based formulations consistently provided highly practicable work/strip times and tensile strengths. As is known to those experienced in the art, such times and tensile strengths may be suitable for a significant range of applications without substantial modification.

Four embodiments of the present invention were tested as replacements for phenol formaldehyde in a foundry binder system. These embodiments comprised two mixtures termed PH3 and PH4. The mixture referred to as PH3 was composed of 72.6% saccharide (corn syrup), 17.7% ethylene glycol, and 9.7% propylene carbonate. The mixture referred to as PH4 was composed of 65.3% saccharide (corn syrup), 15.9% ethylene glycol, 8.7% propylene carbonate, and 10% water.

Sand was evenly coated with the PH3 component and then combined with a commercially available isocyanates and solvent mixture with an amine catalyst to form a phenolic urethane polymer adhesive that acted as a foundry sand binder. Coating of the sand consisted of mixing 3 kilograms of IC55 silica sand with 0.3% of the PH3 component, 1.2% of commercially available isocyanate and solvent mixture and 0.225% of a commercially available tertiary amine catalyst in paddle type mixer. After the sand was coated sufficiently the mixture was packed into the test coupon mold. Tensile strength of the bonded sand test coupons was measured at 10 minutes, 1 hour, 3 hours, and 24 hours after the sand had cured. Standard permeability, and scratch hardness tests were also conducted. The testing procedure was repeated with the PH4 mixture. Two isocyanates were evaluated and the results compared to a commercially available phenolic urethane foundry binder.

Test Series A was comprised of 20% PH3 and 80% isocyanate A (MDI based—diluted in solvent). The work time was 8 minutes and the strip time was 12 minutes. Test series B was comprised of 20% PH4, 80% Isocyanate A. The work time was 5.5 minutes and the strip time was 7.5 minutes. Test Series C was comprised of 20% PH3 and 80% Isocyanate B (MDI based diluted in low VOC solvent). The work time was 5.5 minutes and the strip time was 15 minutes. Test series D was comprised of 20% PH3 and 80% Isocyanate C (MDI based—water compatible). The work time was 3.5 minutes and the strip time was 4.5 minutes. Commercial baseline refers to a standard phenolic urethane no bake system using 55% Pep Set 1000, 45% Pep Set 2000, and 8% (binder weight) Pep Set 3500. The work time was 3.5 minutes and the strip time was 4.25 minutes.

Through this testing we learned that small water additions did not affect the tensile strength development of the binder system and may actually aid in the ability to evenly coat the aggregate, silica sand in this case. When combined with commercially available MDI mixtures the saccharides yielded tensile strength equal to or higher than a commercially available phenol formaldehyde foundry binder. The tensile properties developed with water compatible isocyanates were slightly lower than the commercially available phenol formaldehyde foundry binder.

The invention claimed is:

1. A process for making a foundry mold, the process comprising:
    forming a mixture comprising:
        a foundry aggregate,
        a saccharide component which is underivatized,
        an isocyanate component, and
        a catalyst component capable of catalyzing polymerization of the saccharide component and the isocyanate component to form a polyurethane binder, and
        allowing the saccharide component, the isocyanate component and the catalyst component to react to form the polyurethane binder, thereby forming the foundry mold,
        wherein the mixture contains sufficient catalyst so that foundry work time of the mixture is between about 1 and about 30 minutes.

2. The process of claim 1, wherein allowing the saccharide component, the isocyanate component, and the catalyst component to react to form the polyurethane binder comprises allowing the saccharide component, the isocyanate component, and the catalyst component to cure at ambient temperature.

3. The process of claim 1, wherein the catalyst component comprises a liquid amine, and allowing the saccharide component, the isocyanate component, and the catalyst component to react to form the polyurethane binder comprises allowing the saccharide component, the isocyanate component, and the catalyst component to react to form the polyurethane binder, thereby forming the foundry mold, without baking the foundry mold.

4. The process of claim 1, wherein:
the catalyst component comprises an amine gas, and
forming the mixture comprises passed the amine gas through a mixture of the foundry aggregate, the saccharide component, and the isocyanate component.

5. The process of claim 4, wherein allowing the saccharide component, the isocyanate component, and the catalyst component to react to form the polyurethane binder comprises allowing the saccharide component, the isocyanate component, and the catalyst component to react using a cold box process.

6. The process of claim 1, wherein forming the mixture comprises combining the saccharide component, the isocyanate component, and the catalyst component into the mixture and thereafter forming the mixture into a shape defines an open volume corresponding to an article to be cast.

7. The process of claim 6, wherein the foundry aggregate, the saccharide component and the isocyanate component are combined, the composition so made is formed into said shape, and thereafter a catalyst component comprising a tertiary amine gas is passed through the shaped composition.

8. The process of claim 1, wherein the mixture contains water.

9. The process of claim 1, wherein the saccharide component is substantially free of volatile organic compounds.

10. The process of claim 1, wherein the saccharide component is substantially free of aromatic solvents.

11. The process of claim 1, wherein the isocyanate component comprises one or more isocyanates selected from the group consisting of 2,4- and 2,6-diisocyanatotoluene (TDI) and their derivatives, methylenediphenyl 4,4'-, 2,4- and 2,2'-diisocyanates (MDI) and their derivatives, polymeric MDI's (PMDI), 1,5-naphthalene diisocyanate (NDI), 4,4', 4"-triisocyanatotriphenylmethane and bis(3,5-diisocyanato-2-methylphenyl)methane, 1,6-hexamethylene diisocyanate (HDI), and 3-isocyanatomethyl-3,5,5-trimethylcyclohexyl (isophorone) isocyanate (IPDI).

12. The process of claim 1, wherein the mixture further comprises a non-saccharide polyol component comprising a polyol selected from the group consisting of ethylene glycol, 1, 2-propylene glycol, 1,3-propylene glycol, hexane 1,6-diol, 2 methyl-1,3 propanediol, glycerol, mannitol, sorbitol, diethylene glycol, triethylene glycol, polyethylene glycols, polypropylene glycols, butylene, dibutylene, and polybutylene glycols, and allowing the saccharide component, the isocyanate component, and the catalyst component to react to form the polyurethane binder comprises allowing the saccharide component, the non-saccharide polyol, the isocyanate component and the catalyst component to react to form the polyurethane binder.

13. The process of claim 12, wherein:
the saccharide component is present in an amount ranging from about 5 to about 65 weight percent of the polyurethane binder,
the non-saccharide polyol component is present in an amount ranging from about 1 to about 60 weight percent of the polyurethane binder, and
the isocyanate component is present in an amount ranging from about 10 to about 80 weight percent of the polyurethane binder.

14. The process of claim 12, wherein:
the saccharide component is present in an amount ranging from about 10 to about 40 weight percent of the polyurethane binder,
the non-saccharide polyol component is present in an amount ranging from about 10 to about 50 weight percent of the polyurethane binder, and
the isocyanate component is present in an amount ranging from about 20 to about 70 weight percent of the polyurethane binder.

15. The process of claim 1, wherein the saccharide component comprises a polysaccharide selected from the group consisting of cellulose, levan, pullulan, corn syrup, molasses, and combinations thereof.

16. The process of claim 1, wherein the saccharide component is corn syrup.

17. The process of claim 1, wherein the foundry aggregate is selected from the group consisting of silica sand, lake sand, zircon, olivine, chromite, mullite, and combinations thereof.

18. The process of claim 1, wherein:
the saccharide component is present in an amount ranging from about 15 to about 20 weight percent of the polyurethane binder,
the isocyanate component is present in an amount ranging from about 20 to about 70 weight percent of the polyurethane binder, and
the aggregate is present in an amount of at least 70 weight percent of the foundry mold.

* * * * *